US012241533B2

(12) United States Patent
Verhoog et al.

(10) Patent No.: US 12,241,533 B2
(45) Date of Patent: Mar. 4, 2025

(54) DIFFERENTIAL DRIVE SYSTEM, MORE PARTICULARLY FOR USE IN A POWER TRAIN OF A MOTOR VEHICLE

(71) Applicant: VALEO EMBRAYAGES, Amiens (FR)

(72) Inventors: Roël Verhoog, Cergy-Pontoise (FR); Herve Maurel, Cergy-Pontoise (FR); Jerome Boulet, Cergy-Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/250,661

(22) PCT Filed: Oct. 27, 2021

(86) PCT No.: PCT/EP2021/079855
§ 371 (c)(1),
(2) Date: Apr. 26, 2023

(87) PCT Pub. No.: WO2022/090328
PCT Pub. Date: May 5, 2022

(65) Prior Publication Data
US 2023/0417310 A1    Dec. 28, 2023

(30) Foreign Application Priority Data

Oct. 27, 2020 (FR) ...................................... 2011009

(51) Int. Cl.
*F16H 48/24* (2006.01)
*B60K 17/35* (2006.01)
(Continued)

(52) U.S. Cl.
CPC ........... *F16H 48/08* (2013.01); *B60K 17/352* (2013.01); *F16D 11/14* (2013.01); *F16D 28/00* (2013.01);
(Continued)

(58) Field of Classification Search
CPC .......... F16H 48/08; F16H 48/22; F16H 48/24; F16H 48/20; F16H 48/34;
(Continued)

(56) References Cited

U.S. PATENT DOCUMENTS 6,027,422 A * 2/2000 Yamazaki .............. B60K 23/04
192/53.36
6,966,863 B2 * 11/2005 Teraoka ................. H02K 7/108
475/154

(Continued)

FOREIGN PATENT DOCUMENTS

CN     209324887 U    8/2019
WO   WO 2011/064364 A1    6/2011

OTHER PUBLICATIONS

International Search Report issued Jan. 3, 2022 in PCT/EP2021/079855 filed on Oct. 27, 2021 therein 2 pages.

*Primary Examiner* — Roger L Pang
(74) *Attorney, Agent, or Firm* — Oblon, McClelland, Maier & Neustadt, L.L.P.

(57) ABSTRACT

A differential drive system for a vehicle includes a differential drive device, a dog clutch device, and an electromagnetic actuator. The axis of rotation of the differential drive device is situated outside of the annular electromagnet of the electromagnetic actuator.

17 Claims, 8 Drawing Sheets

(51) Int. Cl.
*F16D 11/14* (2006.01)
*F16D 28/00* (2006.01)
*F16H 48/08* (2006.01)
*F16H 48/34* (2012.01)
*F16H 48/40* (2012.01)
*F16D 11/00* (2006.01)

(52) U.S. Cl.
CPC ............ *F16H 48/24* (2013.01); *F16H 48/34* (2013.01); *F16H 48/40* (2013.01); *F16D 2011/008* (2013.01); *F16H 2048/346* (2013.01)

(58) Field of Classification Search
CPC . F16H 2048/346; F16H 48/40; B60K 17/352; F16D 11/14; F16D 28/00
USPC .................................................. 475/230, 249
See application file for complete search history.

(56) References Cited

U.S. PATENT DOCUMENTS

| | | | |
|---|---|---|---|
| 7,294,085 B2* | 11/2007 | Pistagnesi | F16H 48/08 |
| | | | 475/231 |
| 2004/0020742 A1* | 2/2004 | Cook | F16H 48/08 |
| | | | 180/247 |
| 2004/0142786 A1* | 7/2004 | Fusegi | F16H 48/34 |
| | | | 475/231 |
| 2012/0252621 A1 | 10/2012 | Seidl et al. | |
| 2018/0216671 A1 | 8/2018 | Reichert et al. | |
| 2019/0331206 A1 | 10/2019 | Yudell et al. | |
| 2020/0096054 A1 | 3/2020 | Smith et al. | |

\* cited by examiner

[Fig.1]
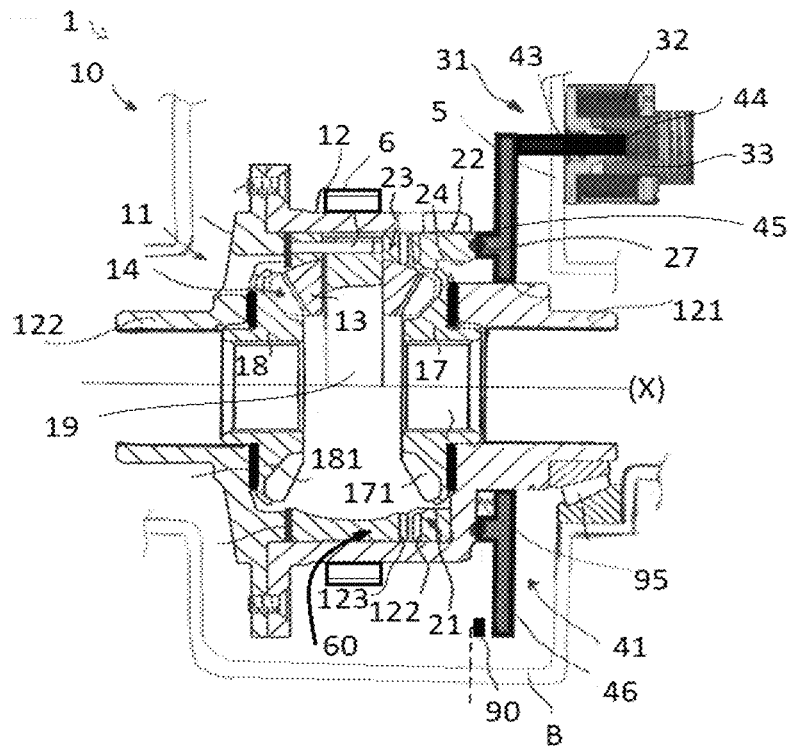
[Fig.2]
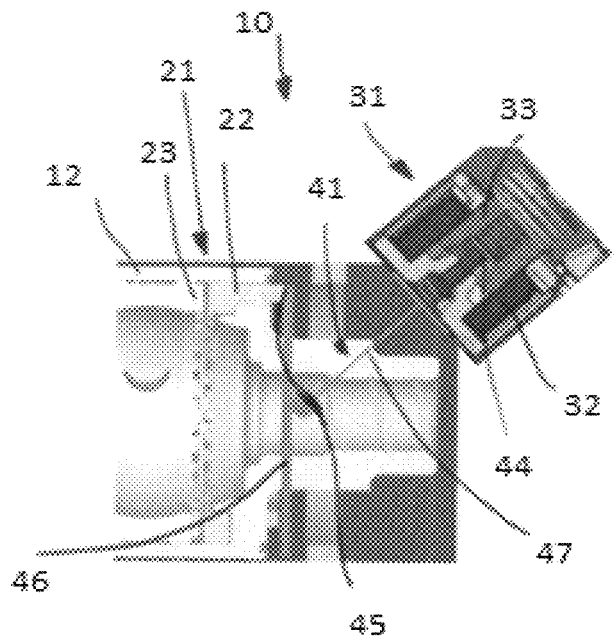

[Fig.3]
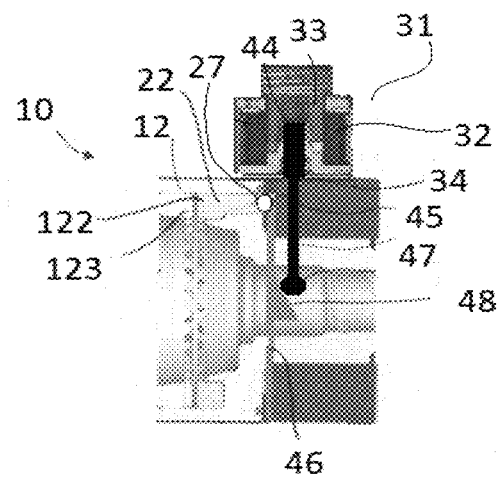
[Fig.4]
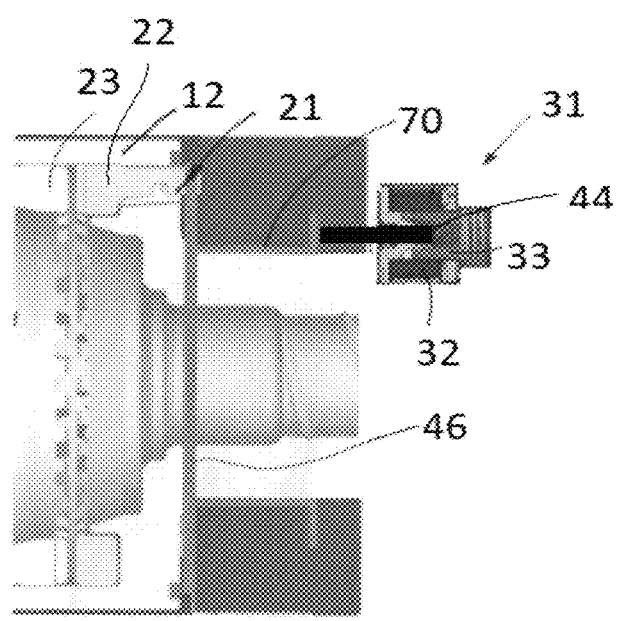

[Fig.5]
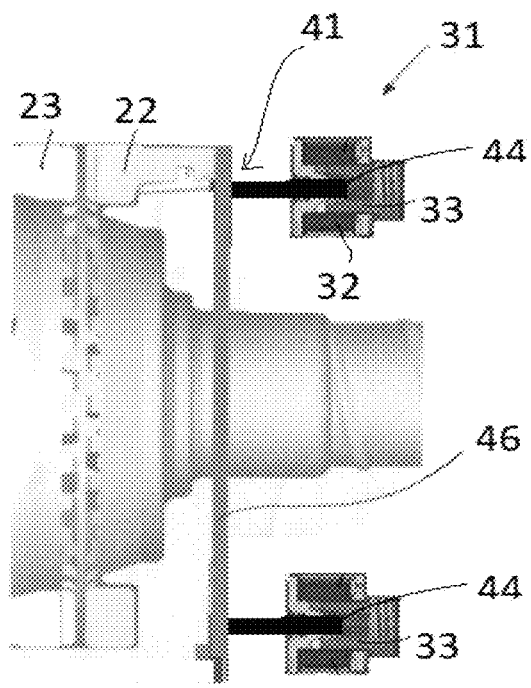
[Fig.6]
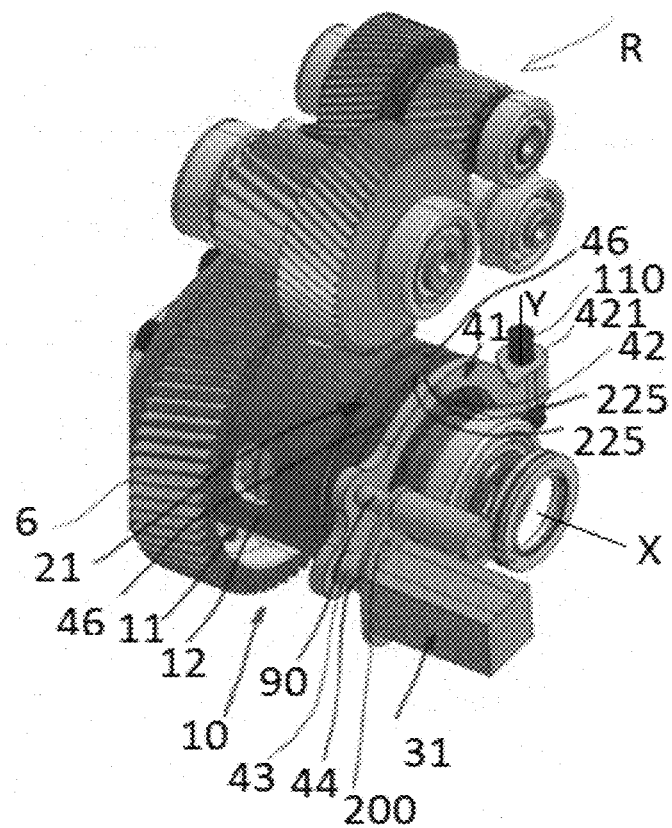

[Fig.10]
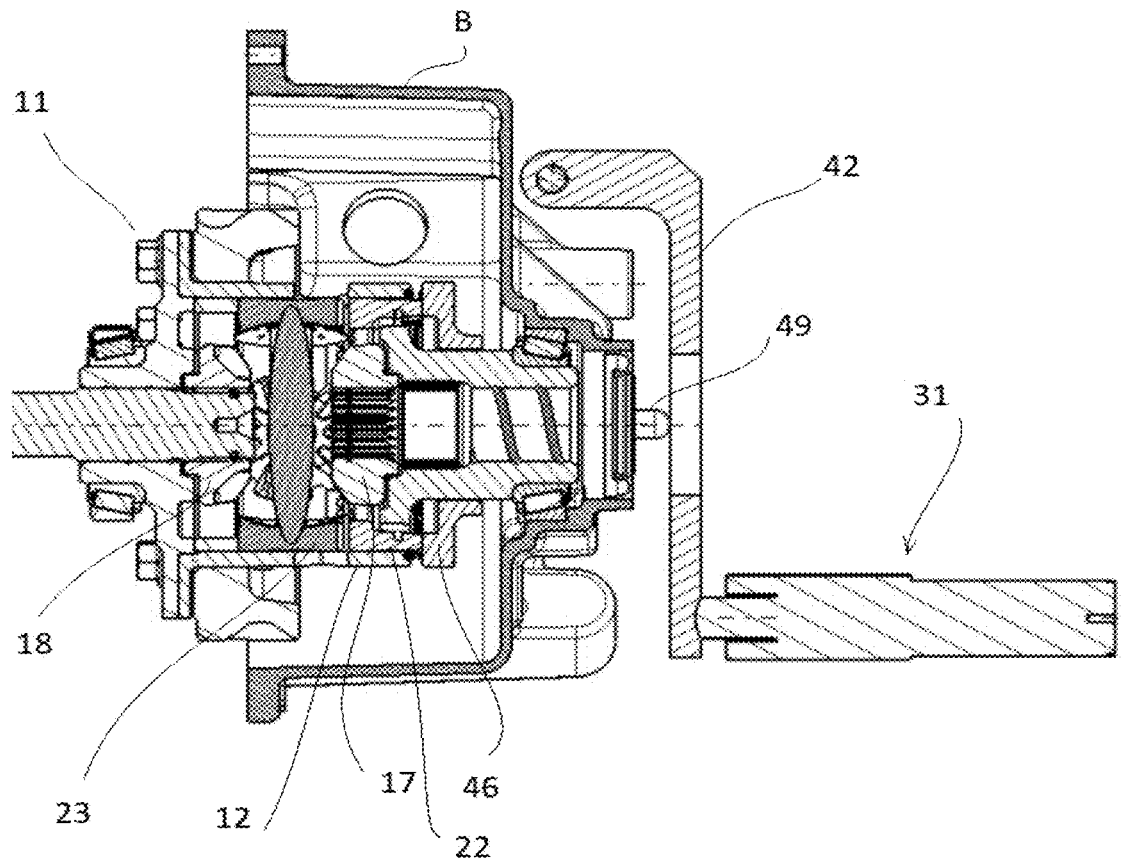
[Fig.11]
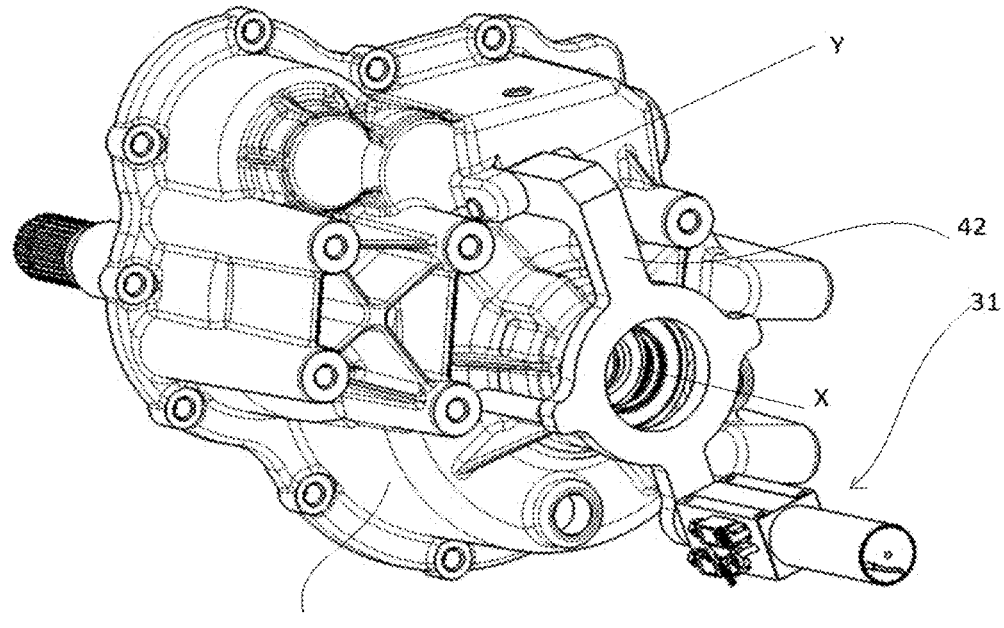

[Fig.12]
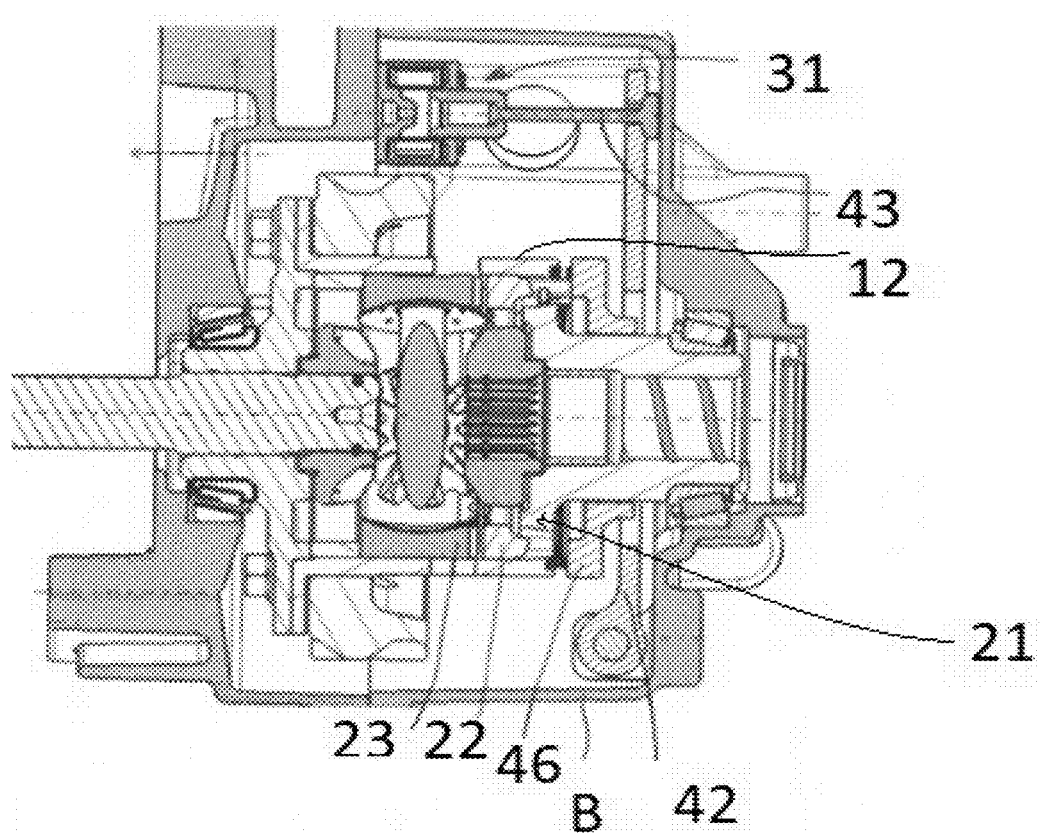
[Fig.13]
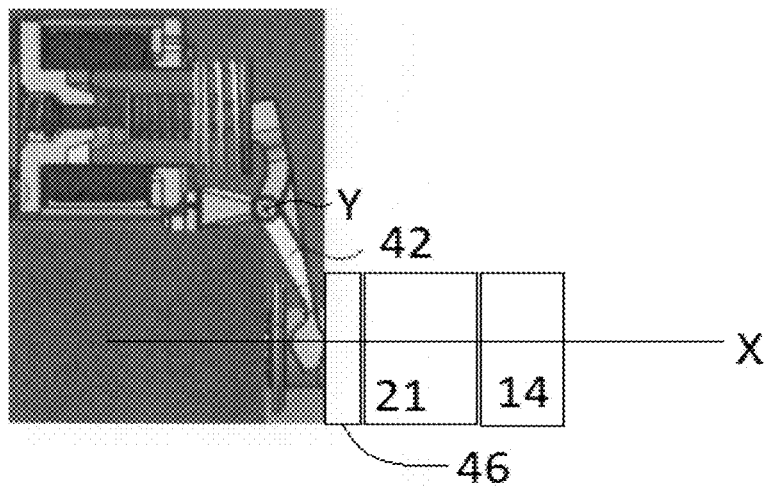

DIFFERENTIAL DRIVE SYSTEM, MORE PARTICULARLY FOR USE IN A POWER TRAIN OF A MOTOR VEHICLE

The invention relates to a differential drive system, more particularly intended for use in a powertrain of a motor vehicle. This drive system comprises, on the one hand, a differential drive device used for transmitting the torque from a drive engine to the two side shafts of an axle and, on the other hand, a dog clutch device. Furthermore, the invention relates to a powertrain comprising such a differential drive system.

The dog clutch devices may be used to interrupt the transmission of torque between the engine and the two side shafts, or to lock up the differential, which is to say to drive the two side shafts at the same speed.

The use of an electromagnetic actuator to lock up a differential is known, for example from document EP1726851.

The use of an electromagnetic actuator to disconnect drive to a differential, namely to interrupt the transmission of torque kinematic upstream of the differential gear set is also known, from document EP1435479.

It is known practice for these electromagnetic actuators to be powered with a nominal voltage of 12V.

In these documents, the two side shafts of the axle extend into opposite directions along the same axis and the electromagnetic actuator comprises an annular electromagnet arranged coaxially with respect to this axis. More specifically, the annular electromagnet is generally positioned around an output hub driving one of the side shafts. Because of its large size and fairly large internal diameter, such an annular electromagnet is not very energy efficient.

In addition, when electromagnetic sensors are used to control the position of the dog clutch device, the proximity of a coaxial annular electromagnet may falsify the measurements. Correcting for these errors adds complexity to the position-control device.

On the other hand, the proximity of a coaxial annular electromagnet may hamper the ability to position these sensors near the dog clutch device.

It is an object of the present invention to propose a differential drive system with a differential drive device and with an electromagnetic actuator that is more energy efficient, and easier to produce and to implement in the differential drive system. Another advantage is that of favoring the use of electromagnetic position sensors.

The objective is achieved by proposing a differential drive system for a motor vehicle, comprising:
- a differential drive device comprising a differential casing housing a differential gearset, the differential gearset being able to transmit torque from the differential casing to a first output side shaft and a second output side shaft which each drive a wheel of the vehicle, the first output side shaft and the second output side shaft extending along an axis of rotation X,
- a dog clutch device comprising a first coupling member and a second coupling member, the second coupling member being able to be rotationally driven about the axis of rotation (X) and being able to move axially along the axis of rotation X with respect to the first coupling member so as to engage with the first coupling member or disengage therefrom, the first coupling member being formed by a toothed torque-transmission member of the differential drive device,
- an electromagnetic actuator comprising an annular electromagnet able to generate a magnetic field to move a mobile element between a first position associated with the engaged state of the dog clutch device, and a second position associated with the disengaged state of the dog clutch device.

According to the invention, the axis of rotation X is situated outside of the annular electromagnet of the electromagnetic actuator, and the differential drive system further comprises a force-transfer mechanism designed to transfer the forces of actuation of the mobile element of the electromagnetic actuator to the second coupling member of the dog clutch device.

In this way, it is possible to reduce the size of the annular electromagnet, notably by decreasing the internal diameter thereof. This then reduces the mass of copper and the electrical consumption of the electromagnet.

Since the magnetic flux produced by the electromagnet is proportional to the number of turns of the electromagnet winding, multiplied by the intensity of the current, it is possible, with a markedly smaller electromagnet, to obtain an equivalent magnetic flux and an equivalent force of actuation.

In addition, by offsetting the electromagnet, the use of sensors, notably electromagnetic sensors, close to the dog clutch device is favored, and the installation of the sensors close to the claw coupling is simplified.

In the remainder of the document, the electromagnetic actuator will also be referred to as an actuator.

The invention may also include one or more of the following features:

The axis of rotation X does not pass through the electromagnetic actuator.

The annular electromagnet is positioned about an axis, this axis being offset from the axis of rotation X. This axis may also be referred to as the "axis of the electromagnet".

The axis of rotation X is positioned, with respect to the axis of the electromagnet, radially outside of the annular electromagnet.

The first coupling member and the second coupling member are arranged circumferentially around the axis of rotation X.

The differential casing is secured, in terms of rotation about the axis of rotation X, to a gearwheel arranged around the axis of rotation X, the gearwheel being able to be driven by a reduction gearbox of the vehicle.

The mobile element of the actuator collaborates with a rod which it drives with it in translational movement. The rod and the mobile element may be translationally inseparable.

As a preference, the mobile element is magnetic and the rod is non-magnetic.

The force-transfer mechanism may have a rigid structure or comprise several parts able to move or articulated relative to one another.

The first coupling member is able to be driven in rotation about the axis of rotation X by the second coupling member.

The first coupling member is positioned at least partially, or fully, inside of the differential casing.

The electromagnetic actuator is positioned outside of the differential casing.

The force-transfer mechanism is positioned partly or fully outside of the differential casing.

According to one embodiment, the external diameter of the second coupling member is at least two times greater, notably more than three times greater, than the external diameter of the annular electromagnet.

The second coupling member is able to be driven in rotation about the axis of rotation X with the differential casing.

According to another embodiment, the second coupling member is secured, in terms of rotation, to the differential casing.

According to one embodiment, the differential casing has holes distributed about the axis of rotation, and the second coupling member has fingers passing axially through these holes so as to secure, in terms of rotation about the axis of rotation X, the second coupling member and the differential casing.

Advantageously, the second coupling member has teeth able to mesh with complementing teeth of the first coupling member through axial translation of the second coupling member toward the first coupling member.

Where applicable, the teeth of the second coupling member are arranged circumferentially about the axis of rotation X.

The second coupling member comprises a disk which secures together, in terms of translation along the axis of rotation X, all of the teeth of the second coupling member, the disk of the second coupling member being arranged about the axis of rotation X.

According to one embodiment, the disk is arranged inside of the differential casing.

According to one embodiment, the fingers of the second coupling member connect the teeth to the disk of the second coupling member. In this scenario, the disk is sited outside of the differential casing.

Advantageously, the differential casing forms a torque input member of the differential drive device.

The differential drive device further comprises a first output member able to be coupled to the first output side shaft, and a second output member able to be coupled to the second output side shaft.

The axis along which the electromagnetic actuator extends is situated outside of the first and second output members.

The first and second output members may be connected respectively to the first and second side shafts using splines.

The differential gearset is configured to transmit torque, directly or indirectly, between the differential casing and the first and second output members of the differential drive device.

The differential gearset comprises a first output pinion able to drive the rotation of the first output side shaft and a second output pinion able to drive the second output side shaft.

The first output pinion and the second output pinion each have an external diameter that is greater than the external diameter of the annular electromagnet.

The first output pinion may be formed as one piece with the first output member.

The second output pinion may be formed as one piece with the second output member.

According to one embodiment, the differential drive system is provided with a disconnection mechanism configured to interrupt the transmission of torque between the differential casing and the differential gearset when the dog clutch device is open.

According to one embodiment, the first coupling member forms an auxiliary input member of the differential drive device, the differential gearset being configured to transmit torque between the auxiliary input member and the first and second output members of the differential drive device.

Advantageously, the auxiliary input member is mounted with the freedom to rotate with respect to the differential casing and it is secured in terms of rotation to the differential casing only when the dog clutch device is closed.

As a preference, the auxiliary input member is mounted inside of the differential casing.

In other words, the first coupling member is positioned inside of the differential casing.

In the direction whereby torque is transmitted from the reduction gearbox to the wheels of the vehicle, the differential casing is positioned upstream of the auxiliary input member.

The auxiliary input member is a ring gear extending circumferentially about the axis of rotation X.

The complementing teeth of the ring gear extend axially toward the teeth of the second coupling member.

The auxiliary input member, or first coupling member, is mounted secured, in terms of rotation about the axis of rotation X, to a first input pinion and a second input pinion of the differential gearset.

The force-transfer mechanism comprises a first contact zone collaborating with the mobile element of the electromagnetic actuator and moving with same; and a second contact zone collaborating with the second coupling member and moving axially with same.

In other words, the second contact zone is a zone for pushing on the second coupling member.

This pushing zone may extend circumferentially continuously or discontinuously about the axis of rotation X.

The force-transfer mechanism may be a rigid structure or else may be articulated between its first and second contact zones.

The force-transfer mechanism, notably the second contract zone thereof, and the second coupling member may be mounted with the ability to rotate relative to one another about the axis of rotation X.

According to one embodiment, a bearing, notably a rolling-contact bearing, extending about the axis of rotation X, may be mounted between the force-transfer mechanism and the second coupling member. In a variant, a pad bearing, notably having plastic pads, may be used.

According to another embodiment, the second coupling member comprises a first part pushed by the force-transfer mechanism and a second part collaborating with the first coupling member, the first part and the second part of the second coupling member being designed to rotate relative to one another about the axis of rotation X. Where applicable, it is not necessary for the force-transfer mechanism, and the second coupling member to be mounted with the ability to rotate relative to one another about the axis of rotation X.

Advantageously, the first part and the second part of the second coupling member are secured to one another in terms of axial translational movement.

For example, a bearing or pads may allow this relative rotation between the first part and the second part of the second coupling member.

According to one embodiment, the electromagnetic actuator is positioned in such a way that the mobile element moves parallel to the axis of rotation X.

Where applicable, the force-transfer mechanism is able to move in axial translation along the axis X.

The force-transfer mechanism may have a rigid structure.

According to one embodiment, on each side of the differential gearset, the differential casing has a tubular portion intended to at least partially encase one of the output side shafts.

The electromagnetic actuator is positioned outside of the tubular portions.

More specifically, the actuator may be positioned on a plane perpendicular to the axis of rotation X passing through one of the tubular portions, outside of this tubular portion and the axis about which the electromagnetic actuator extends is positioned outside of this tubular portion.

According to one embodiment, the force-transfer mechanism comprises a pressure plate.

The pressure plate may be positioned on the outside of the differential casing.

The second contact zone is arranged on this pressure plate.

Advantageously, the pressure plate is positioned around one of the two tubular portions. It may have an internal contour extending about the axis of rotation X and sliding around the tubular portion.

According to one embodiment, the electromagnetic actuator is positioned in such a way that the mobile element moves in a direction not parallel to the axis of rotation X but with a component along the axis of rotation X, the force-transfer mechanism having a first part moving in the direction of the mobile element and a second part moving in the direction of travel of the second coupling member.

The first part and the second part of the force-transfer mechanism may rotate relative to one another with respect to the axis of rotation X.

Advantageously, the second part of the force-transmission mechanism is formed by the pressure plate.

The first part of the force-transmission mechanism comprises an arm of which a first end is arranged on the side of the actuator and of which a second end is arranged on the side of the pressure plate.

According to one embodiment, the arm moves translationally in the same direction as the mobile element.

The second end of the arm is configured to move over the pressure plate when the second coupling member moves axially. In other words, the distance between the axis of rotation X and the second end of the arm varies according to the position of the mobile element.

According to another embodiment, the electromagnetic actuator is positioned in such a way that the mobile element moves in a direction perpendicular to the axis of rotation.

According to another embodiment, the pressure plate comprises a ramp and the second end of the arm is configured to move along this ramp.

Where applicable, the ramp is configured to generate forces in the direction of the axis of rotation X from the forces transmitted by the arm.

According to another embodiment, the mobile element moves in a direction parallel to the axis of rotation X and the force-transfer mechanism comprises a cylinder arranged around the axis of rotation X and extending along this axis, the cylinder having a first end pushed by the mobile element or the rod associated with the mobile element, and a second end fixed to the pressure plate. Thus, cantilever effects are limited.

According to another embodiment, the differential drive system comprises a plurality of electromagnetic actuators, the force-transfer mechanism connecting each electromagnetic actuator to the second coupling member.

Where applicable, each mobile element collaborates with a respective rod of the force-transfer mechanism which it drives with it in translational movement.

Each rod may be fixed to the pressure plate. Where applicable, the pressure plate is mounted with the ability to rotate with respect to the second coupling member.

The electromagnetic actuators are positioned uniformly about the axis of rotation X.

According to one embodiment, the force-transfer mechanism is configured to increase the force of actuation generated by the actuator, for example by means of a lever arm.

According to another embodiment, the force-transfer mechanism comprises a pivoting lever able to push the pressure plate.

According to one embodiment, the pivoting lever comprises an annular portion arranged around the axis of rotation (X). This annular portion is arranged around one of the output side shafts and/or around one of the first and second output members.

According to one embodiment, the force-transfer mechanism comprises a first part and the second part able to rotate relative to one another about the axis of rotation X.

The axis of pivoting of the lever and the electromagnetic actuator are positioned one on each side of the axis of rotation X.

The lever comprises a pushing zone collaborating with the mobile element or the rod associated with the mobile element, and a pressing zone collaborating with the pressure plate.

The lever may collaborate directly or indirectly with the mobile element of the electromagnetic actuator.

As a preference, the forces are transmitted from the mobile element of the actuator to the lever by the rod.

The forces are transmitted by the mobile element to one end of the lever. Thus the forces can be limited.

As a preference, the axis of pivoting is situated at the other end of the lever.

The rod/lever contact interface is configured to allow the lever to incline relative to the rod.

The interface may be of spherical type, one end of the rod having the form of a portion of a sphere, and the lever comprising a cavity in the form of a portion of a sphere accommodating the end of the rod.

Further, the pressure plate may comprise at least one load-spreading boss projecting toward the lever, the lever and the pressure plate being arranged in such a way as to transmit a pushing force via each load-spreading boss.

Each load-spreading boss is configured to allow the lever to pivot and to press on the pressure plate via a uniform area of contact.

In particular, the boss is rounded. Thus, the lever ratio can remain constant irrespective of the angle of the lever.

As an alternative, the pressure plate has fingers extending as far as the lever.

According to another embodiment, the differential drive system is provided with a differential locking mechanism, the first coupling member being secured to, in terms of rotation, or else formed as one with, one of the first and second output members of the differential drive device and the second coupling member being able to be driven such that it rotates as one with the differential casing, at least when the dog clutch device is closed.

The said first or second output members are then secured, in terms of rotation, to the differential casing when the dog clutch device is closed such that the first and second output members of the differential drive device rotate at the same speed.

The foregoing features applied to the disconnection device, notably as regards the force-transfer mechanism, may equally be applied in the context of a locking device.

The invention also relates to a transmission system comprising a reduction gearbox housed inside of a reduction gearbox casing and a differential drive system as described hereinabove.

According to one embodiment, the differential casing is secured, in terms of rotation about the axis of rotation X, to a gearwheel arranged around the axis of rotation X, the gearwheel being able to be driven by the reduction gearbox of the vehicle.

According to one embodiment, the differential casing is positioned inside of the reduction gearbox casing.

According to one embodiment, the electromagnetic actuator is positioned outside of the reduction gearbox casing. Thus, the actuator is protected from splashed oil and is easier to maintain.

As an alternative, the electromagnetic actuator is positioned inside of the reduction gearbox casing.

According to one embodiment, the differential drive system comprises a sensor for directly or indirectly determining the closed state of the dog clutch device.

According to one embodiment, the sensor and the electromagnetic actuator are supported by a common support.

According to one embodiment, the force-transfer mechanism passes through the reduction gearbox casing.

As a preference, a rolling-contact bearing is positioned between the differential casing, particularly between each tubular portion of the differential casing, and the reduction gearbox casing.

According to one embodiment, the lever is arranged inside of the reduction gearbox casing.

As an alternative, the lever is arranged outside of the reduction gearbox casing.

As applicable, the pressure plate may comprise fingers extending towards the lever and passing through the reduction gearbox casing, the lever being arranged in such a way as to press against these fingers and push them in order to close the dog clutch device.

The rod may form part of the actuator or of the force-transmission mechanism.

The invention also relates to a powertrain comprising an electric machine and a transmission system as described hereinabove, the reduction gearbox being driven by said electric machine.

The invention also relates to a differential drive device comprising:
  a differential drive device comprising a differential casing housing a differential gearset, the differential gearset being able to transmit torque from the differential casing to a first output side shaft and a second output side shaft, the first output side shaft and the second output side shaft extending along an axis of rotation X,
  a dog clutch device comprising a first coupling member and a second coupling member, the second coupling member being able to be rotationally driven about the axis of rotation X and being able to move axially along the axis of rotation X with respect to the first coupling member so as to engage with the first coupling member or disengage therefrom, the first coupling member being formed by a toothed torque-transmission member of the differential drive device,
  an electromagnetic actuator comprising an annular electromagnet able to generate a magnetic field to move a mobile element between a first position associated with the engaged state of the dog clutch device, and a second position associated with the disengaged state of the dog clutch device, the electromagnetic actuator being powered by a source of electricity of which the nominal voltage is greater than 12V, notably comprised between 24V and 60V, for example 48V.

Thus, by comparison with electromagnets powered at 12V, there is less of a problem of filtering the power supply at the input to the actuator because the filtering requirements are not as demanding for a voltage of 48V as they are for a voltage of 12V. In addition, the Joule losses are reduced and the cable cross sections can be smaller and there are fewer losses in the power supply cable and in the power electronics powering the electromagnetic actuator.

According to one embodiment, the differential drive system comprises a plurality of electromagnetic actuators, each electromagnetic actuator comprising an annular electromagnet able to generate a magnetic field that moves a mobile element between the first position associated with the engaged state of the dog clutch device, and the second position associated with the disengaged state of the dog clutch device, The electromagnetic actuators may be mounted in series.

For example, the differential drive system may comprise four electromagnets operating on a voltage of 12V, or three electromagnets operating on a voltage of 16V, or two electromagnets operating on a voltage of 24V.

According to an alternative, the actuators are connected in parallel.

According to one embodiment, the differential drive system further comprises a force-transfer mechanism designed to transfer the forces of actuation of the mobile element or elements to the second coupling member of the dog clutch device.

BRIEF DESCRIPTION OF THE FIGURES

The invention will be understood better, and further aims, details, features and advantages thereof will become more clearly apparent, from the following description of a plurality of particular embodiments of the invention, which are given only by way of non-limiting illustration, with reference to the appended drawings.

FIG. 1 is a schematic sectional view of a first embodiment of the invention.

FIG. 2 is a schematic view of a second embodiment.

FIG. 3 is a schematic view of a third embodiment.

FIG. 4 is a schematic view of a fourth embodiment.

FIG. 5 is a schematic view of a fifth embodiment.

FIG. 6 is a schematic perspective view of a sixth embodiment.

FIG. 10 is a schematic sectional view of a seventh embodiment.

FIG. 11 is a schematic perspective view of the seventh embodiment.

FIG. 12 is a schematic sectional view of an eighth embodiment.

FIG. 13 is a schematic view of a ninth embodiment.

Figure 7:
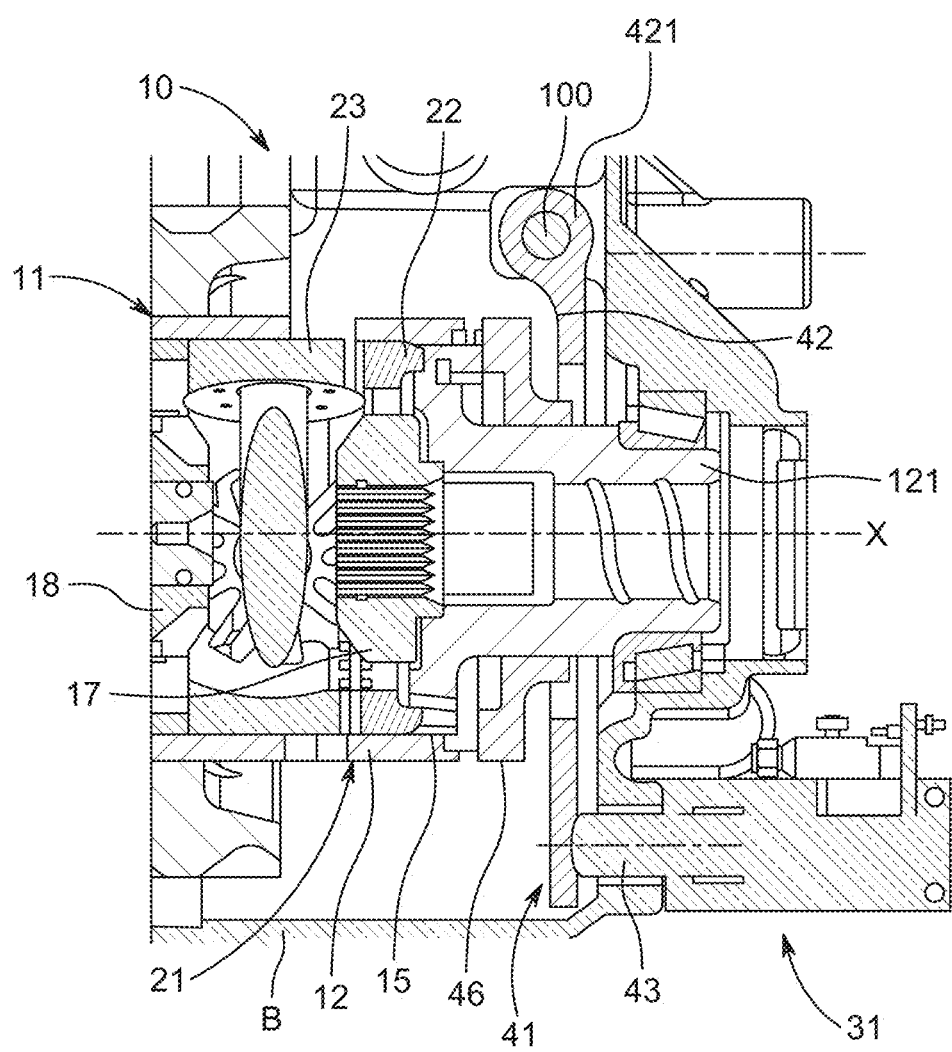
FIG. 7 is a sectional view of the sixth embodiment.
Figure 8:
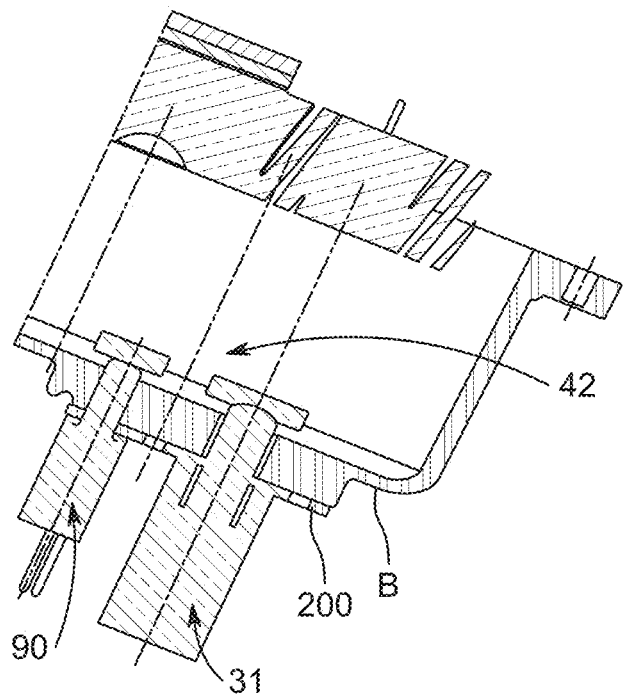
FIG. 8 is a schematic sectional view of the sensor and of the actuator of the sixth embodiment.

The electric motors may be used as supplementary drive units in a motor vehicle which, in addition to the electric motor, has an internal combustion engine as main power unit. Therefore the electric motor is often used to cause the vehicle to move forward at low speed, for example in town. Because of the relatively high torque supplied by the electric motor, there is good traction and good behavior on starting. At higher speeds, the electric motor is cut off and, in order to avoid the drag torque of the electric motor having an adverse effect on efficiency, a disconnection mechanism is therefore used, which mechanism is positioned in the driveline between the electric motor and the differential gearset.

Thus, in embodiments 1 to 9 described hereinbelow, the dog clutch device acts in such a way as to interrupt the transmission of torque kinematically upstream of a differential gearset. In the various embodiments, the elements that perform substantially equivalent functions will bear the same references.

Hereinafter, the axial direction, unless mentioned otherwise, refers to the axis of rotation X of the differential drive device. The radial direction is also determined with respect to the axis of rotation X.

FIG. 1 schematically depicts a differential drive system 10 comprising a differential drive device 11, a dog clutch device 21, an electromagnetic actuator 31 and a force-transfer mechanism 41 arranged in such a way as to transfer the forces of actuation of the electromagnetic actuator 31 to the dog clutch device 21.

The differential drive system is arranged within a transmission system which further comprises a reduction gearbox R and a reduction gearbox casing B.

The differential drive device 11 comprises a differential casing 12 housing a differential gearset 14. The differential gearset 14 is able to transmit a torque from the differential casing 12 to a first output side shaft and a second output side shaft (which are not depicted) which extend along an axis of rotation X.

The differential casing 12 is secured, in terms of rotation about the axis of rotation X, to a gearwheel 6 arranged around the axis of rotation X, the gearwheel 6 being able to be driven by the reduction gearbox R of the vehicle.

The dog clutch device 21 comprises a first coupling member 23 and a second coupling member 22.

The second coupling member 22 is rotationally driven about the axis of rotation X by the differential casing 12 and can move axially along the axis of rotation X with respect to the first coupling member 23. The opening and closing of the dog clutch device 21 are thus achieved by axial movement of the second coupling member 22 which is able to engage axially with the first coupling member 23 in order to rotate together with it about the axis of rotation X.

The first coupling member 23 is a toothed member of the differential drive device 11 participating in the transmission of torque from the electric motor to the output shafts. In this instance it is a ring gear positioned upstream of the differential gearset that will be described hereinafter.

The electromagnetic actuator 31 comprises an annular electromagnet 32 which is able to generate a magnetic field to move a mobile element 33 between a first position associated with the engaged or closed state of the dog clutch device 21, and a second position associated with the disengaged or open state of the dog clutch device 21.

The differential drive system 10 further comprises a force-transfer mechanism 41 designed to transfer the forces of actuation of the mobile element 33 of the electromagnetic actuator 31 to the second coupling member 22 of the dog clutch device 21.

The reduction gearbox casing B has a wall 5 situated between the electromagnetic actuator 31 and the differential casing 12. The electromagnetic actuator is situated outside of the reduction gearbox casing B. Advantageously, the electromagnetic actuator 31 is mounted pressing against the wall 5 of the reduction gearbox casing B and the force-transmission mechanism 41 passes through the wall 5 of the reduction gearbox casing. The differential casing 12 is situated inside of the reduction gearbox casing B.

In order to secure the second coupling member 22 and the differential casing 12, the differential casing 12 has holes distributed about the axis of rotation X, and the second coupling member 22 has fingers 24 passing axially through these holes so as to secure, in terms of rotation about the axis of rotation X, the second coupling member 22 and the differential casing 12.

The second coupling member 22 has teeth 122 able to mesh with complementing teeth 123 of the first coupling member 23 through axial translation of the second coupling member 22 toward the first coupling member 23. The teeth 122 of the second coupling member 22 are arranged circumferentially about the axis of rotation X.

The second coupling member 22 further comprises a disk which secures together, in terms of translation along the axis of rotation X, all of the teeth 122 of the second coupling member 22. The disk of the second coupling member is arranged about the axis of rotation X.

The axis of rotation X along which the output shafts driven by the differential extend is advantageously situated outside of the annular electromagnet 32 of the electromagnetic actuator 31. In other words, the annular electromagnet 32 is not mounted coaxially with the axis of rotation of the output shafts. Thus, the size of the annular electromagnet 32, notably the inside diameter thereof can be reduced, thereby reducing the mass of copper and the electrical consumption of the electromagnet. The mass of the electromagnetic actuator 31 can also be reduced. Such an actuator is also less expensive.

The differential casing 12 forms a torque input member of the differential drive device 11 and the differential drive device 11 further comprises a first output member 17 able to be coupled to the first output side shaft, and a second output member 18 able to be coupled to the second output side shaft. Each output side shaft drives a wheel of the vehicle. The first and second output members 17 and 18 may be connected respectively to the first and second side shafts using splines. The differential gearset 14 is configured to transmit torque between the differential casing 12 and the first and second output members 17, 18 of the differential drive device 11 while allowing the first and second output side shafts to rotate at different speeds, particularly during cornering.

The differential gearset 14 comprises a first output pinion 171 able to drive the rotation of the first output side shaft and a second output pinion 181 able to drive the second output side shaft. In this instance, the first output pinion 171 is formed as one with the first output member 17 and the second output pinion 181 is formed as one with the second output member 18.

The first coupling member 23 forms an auxiliary input member of the differential drive device 11, the differential gearset 14 being configured to transmit torque between the auxiliary input member 23 and the first and second output members 17, 18 of the differential drive device 11.

The auxiliary input member 23 is mounted with the freedom to rotate with respect to the differential casing 12 and it is secured in terms of rotation to the differential casing 12 only when the dog clutch device 21 is closed. The auxiliary input member 23 is mounted inside of the differential casing 12.

The auxiliary input member 23 is a ring gear extending circumferentially about the axis of rotation X on a plane perpendicular to the axis of rotation X. The complementing teeth 123 of the ring gear extend axially toward the teeth 122 of the second coupling member 22.

The auxiliary input member 23, or first coupling member, is mounted secured, in terms of rotation about the axis of rotation X, to a first input pinion 13 and a second input pinion of the differential gearset 14.

To that end, the auxiliary input member 23 has two orifices that are diametrically opposite one another across the axis of rotation X. The first input pinion 13 comprises one orifice and the second input pinion comprises another orifice. The differential drive device 11 comprises a connecting rod 19 of which a first end zone is inserted into one of the orifices of the auxiliary input member 23 and into the orifice of the first input pinion 13, while the second end zone of the connecting rod 19 is inserted into the other of the orifices of the auxiliary input member 23 and into the orifice of the second input pinion. The first input pinion 13 and the second input pinion thus mounted with the freedom to rotate about the connecting rod 19. The connecting rod 19 thus mounted in the auxiliary input member 23 is able to move in a plane perpendicular to the axis of rotation X, in pivoting with respect to this axis.

On each side, the differential casing 12 comprises a tubular portion 121, 122 at least partially surrounding an output side shaft connected to a wheel. The electromagnetic actuator 31 is positioned outside of these tubular portions 121, 122 and of the output members 17 and 18.

The axis along which the actuator 31 extends and/or around which it is arranged, is situated outside of these tubular portions 121, 122 and of the output members 17 and 18. A rolling-contact bearing is positioned between each tubular portion 121, 122 of the differential casing 12 and the reduction gearbox casing B.

A sensor 90 may be arranged near the force-transmission mechanism 41 in order directly or indirectly to determine the coupling position of the dog clutch device 21 (open, closed, etc.). The off-axis and spaced-away configuration of the actuator 31 is advantageous because the solenoid is distanced from the sensor, something which may in general make it easier to fit the sensor and, when the sensor is a magnetic sensor, it is then subject to less interference from the magnetic field of the solenoid by comparison with a solenoid coaxial with the axis of rotation of the output side shaft.

In order to close the dog clutch device 21, the solenoid 32 is supplied with electrical current, thus generating a magnetic field that moves the mobile element 33. The mobile element 33 pushes the force-transfer mechanism 41 which then pushes axially on the second coupling member 22.

In order to re-open the dog clutch device 21 when the solenoid is no longer being supplied with current, use may be made of an elastic return spring 95. This may be positioned for example between the differential casing 12 and the force-transfer mechanism 41. The second coupling member 22 and the second contact zone 45 of the force-transfer mechanism are, for example, secured to one another axially in both directions so as to re-open the dog clutch device when the elastic return force of the spring 95 exceeds the forces generated by the solenoid, particularly when the latter is no longer being supplied with current. Conversely, when the electromagnet is being powered in order to actuate the second coupling member 22, the forces generated by the mobile element 33 exceed return forces of the spring 95.

As an alternative, the return spring may be arranged between the second coupling member 22 and the differential casing 12.

In addition, the electromagnetic actuator 31 is also equipped with a failsafe return spring that returns the mobile element 33 to its second position, notably in the event of a break in the electrical power supply.

In the first embodiment depicted schematically in FIG. 1, the disk of the second coupling member 22 is positioned inside of the differential casing 12 and the fingers 24 of the second coupling member 22 connect this disk to the force-transfer mechanism 31.

According to the arrangement of FIG. 1, the first coupling member 23 is positioned entirely in the differential casing 12. The electromagnetic actuator 31 is positioned outside of the differential casing 12 and the force-transfer mechanism 41 is positioned entirely outside of the differential casing 12.

The force-transfer mechanism 41 is configured to transfer the forces of actuation of the mobile element 33 of the electromagnetic actuator 31 to the second coupling member 22.

In the first embodiment of FIG. 1, the electromagnetic actuator 31 is positioned in such a way that the mobile element 33 moves parallel to the axis of rotation X; and the force-transfer mechanism 41 is mobile, likewise parallel to the axis X.

The force-transfer mechanism 41 overall here has a rigid structural unit that moves axially parallel to the axis of rotation X. The force of transfer mechanism 41 comprises a pressure plate 46 able to push the fingers 24 of the second coupling member 22 via an annular bulge and a rod to 43 driven in axial translation by the mobile element 33.

The force-transfer mechanism 41 comprises a first contact zone 44 collaborating with the mobile element 33 of the electromagnetic actuator 31 and moving with same; and a second contact zone 45 collaborating with the second coupling member 22 and moving axially with same. In other words, the second contact zone 45 is a zone for pushing on the second coupling member 22. The second contact zone 44 here takes the form of an annular bulge extending circumferentially about the axis of rotation X. This annular pressure bulge is configured to press the end of the fingers 24 of the second coupling member 22 toward the first coupling member 23.

A rotary connection 27 accommodating rotation about the axis of rotation X, and achieved for example using balls or pads, is arranged between the second contact zone 45 of the force-transfer mechanism 41 and the second coupling member 22.

The force-transfer mechanism 41 is also positioned around the tubular portion 121 of the differential casing 12. It has an internal contour extending about the axis of rotation X and sliding around the tubular portion 121.

In the second embodiment depicted in FIG. 2, the electromagnetic actuator 31 is positioned in such a way that the mobile element 33 moves in a direction not parallel to the axis of rotation X but with a component along the axis of rotation X. In the example depicted, the axis of translation of the mobile element is oriented at an angle of around 40° with respect to the axis of rotation X.

The force-transfer mechanism 41 has a first part moving in the direction of the mobile element 33 and a second part moving in the direction of travel of the second coupling member 22, in other words the axial direction.

The first part and the second part of the force-transfer mechanism 41 may rotate relative to one another with respect to the axis of rotation X.

The second part of the force-transmission mechanism 41 is formed by the pressure plate 46 and the first part of the force-transmission mechanism 41 comprises an arm 47 of which a first end is arranged on the side of the actuator 31 and of which a second end is arranged on the side of the pressure plate 46. The arm 47 moves translationally in the same direction as the mobile element 33. The second end of the arm 47 is configured to move over the pressure plate 46 when the second coupling member 22 moves axially. In other words, the distance between the axis of rotation X and the second end of the arm varies according to the position of the mobile element 33.

In the third embodiment depicted in FIG. 3, the electromagnetic actuator 31 is positioned in such a way that the mobile element 33 moves in a direction perpendicular to the axis of rotation (X). In this embodiment, the pressure plate comprises a ramp 48 and the second end of the arm 47 is configured to move along this ramp 48. The ramp 48 is configured to generate forces in the direction of the axis of rotation (X) from the forces transmitted by the arm 47.

In this instance, a rotary connection 27 accommodating rotation about the axis of rotation X is present between the second coupling member 22 and the pressure plate 46 to avoid rotationally fixed driving of the force-transfer mechanism 41 by the second coupling member 22 when the dog clutch device is closed.

As an alternative, the pressure plate 46 is secured in terms of rotation to the fingers 24, and the ramp 48 has a conical shape centered on the axis of rotation X so as to allow relative rotation about the axis of rotation X between the arm 47 and the pressure plate 46.

According to the fourth embodiment depicted in FIG. 4, the mobile element 33 moves in a direction parallel to the axis of rotation X and the force-transfer mechanism 41 comprises a cylinder arranged around the axis of rotation X and extending along this axis, the cylinder having a first end pushed by the rod 43 associated with the mobile element, and a second end fixed to the pressure plate 46. Thus, cantilever effects are limited. A rotary connection (not depicted) accommodating rotation about the axis of rotation X may be present between the second coupling member 22 and the pressure plate 46 or between the pressure plate and the cylinder 70.

In the fifth embodiment depicted in FIG. 5, the differential drive system comprises two electromagnetic actuators 31 and the force-transfer mechanism 41 connects each electromagnetic actuator 31 to the second coupling member 22. The two electromagnetic actuators 31 are positioned diametrically opposite one another with respect to the axis of rotation X. Each mobile element 33 collaborates with a respective rod 43 of the force-transfer mechanism 41 which it drives with it in translational movement. Each rod 43 is secured in terms of translational movement to the pressure plate 46.

The pressure plate 46 may be mounted with the ability to rotate with respect to the second coupling member 22 or with respect to the rods 43.

These actuators 31 may preferably be mounted in series on the 48V electrical network of the vehicle (for example in the case of a hybrid vehicle), each electromagnet therefore receiving a voltage of 24V. In other alternatives, the differential drive system comprises 3 or 4 or even more actuators.

A sixth embodiment is depicted in FIGS. 6 to 9. The force-transfer mechanism 41 comprises a pivoting lever 42 pivoting about an axis of pivoting Y.

The axis of pivoting Y is perpendicular to the axis of rotation X. In projection in a plane perpendicular the axis of pivoting Y and passing through the axis of rotation X, the axis of pivoting Y of the lever 42 and the electromagnetic actuator 31 are arranged one on each side of the axis of rotation X.

The lever 42 may collaborate directly or indirectly with the mobile element 33 of the electromagnetic actuator.

In FIGS. 6 and 7, collaboration between the lever 42 and the mobile element 33 of the electromagnetic actuator 31 is indirect, the torque-transfer mechanism 41 comprising as before a rod 43 that transmits the force from the mobile element 33 of the actuator 31 to the lever 42.

The rod 43 is driven in a translational movement by the mobile element 33 of the actuator 31. The rod 43 and the mobile element 33 thus both move in the same direction. The first contact zone 44 is arranged on a first end of the rod 43, pressing against the mobile element 33.

The rod/lever contact interface is configured to allow the lever 42 to become inclined with respect to the rod 43 and transmit force uniformly between the rod 43 and the lever 42 irrespective of the angle of inclination of the lever 42. The interface here is of spherical type, a second end of the rod 43 having the form of a portion of a sphere, and the lever comprising a cavity in the form of a portion of a sphere accommodating the end of the rod 43.

The lever 42 is in the overall shape of a ring arranged around the axis of rotation X. It comprises an annular portion as well as a tube having a cylindrical bearing surface 421 arranged to pivot about a shaft 110 which is fixed in the differential drive system 10. The shaft extends along the axis of pivoting Y. Thus, the lever 42 is able to pivot about the axis of pivoting Y. The rod 43 and the cylindrical bearing surface of the lever 42 are positioned diametrically opposite one another with respect to the axis of rotation X. What is meant by diametrically opposite is that they are situated on the same diameter, give or take 20 degrees.

The cylindrical bearing surface 421 is formed inside a tube projecting outside of the annular portion of the lever 42. The tube and the annular portion of the lever 42 are formed as a single piece. The cylindrical bearing surface 421 and the shaft 110 may as an alternative be replaced with any other mechanism that provides a pivot connection.

In an alternative form which has not been depicted, it is the lever 42 that advantageously comprises a shaft designed to rotate inside a fixed cylindrical bearing surface in the differential drive system.

Further, the pressure plate 46 may comprise at least one load-spreading boss 225 projecting toward the lever 42, the lever 42 and the pressure plate 46 being arranged in such a way as to transmit a pushing force via each load-spreading boss 225.

Each load-spreading boss 225 is configured to allow the lever 42 to pivot with a pushing contact force that remains uniform as pivoting progresses. In particular, the boss is rounded so as to limit edge effects and have a lever ratio that remains constant as the lever pivots.

The pressure plate 46 and the lever 42 may rotate relative to one another about the axis of rotation X. As an alternative, the pressure plate 46 and the fingers of the second coupling member 22 may rotate relative to one another about the axis of rotation X. Pads may be employed for this purpose.

Another portion of the lever 42 bears or forms a target collaborating with a sensor 90. The sensor is sensitive to the variations in distance between the detection element of the sensor 90 and the lever 42. Thus, the state, open/closed, of the dog clutch device 21 may be determined by a processing unit integrated into the sensor 90 or by a separate processing unit receiving the signal supplied by the sensor and relating to the distance separating the lever from the detection element of the sensor. The signal may be proportional to this distance or else may have a limited number of values, such as two, three or four values indicative of predetermined ranges of distance. The target and the sensor 90 may be magnetic (for example a Hall-effect sensor). As an alternative, it may be any other type of sensor sensitive to the distancing of the lever, for example an infrared position sensor. The target borne by or formed on the lever is of course configured (shape, material) according to the type of sensor used.

In this embodiment, the sensor 90 and the electromagnetic actuator 31 are supported by a common support 200.

The common support 200 has a first opening through which the rod 43 passes and a second opening through which the sensor 90 passes.

In an alternative, the rod 43 may form part of the mobile element of the electromagnetic actuator. Where applicable, the first opening has the mobile element 33 passing through it.

Figure 9:
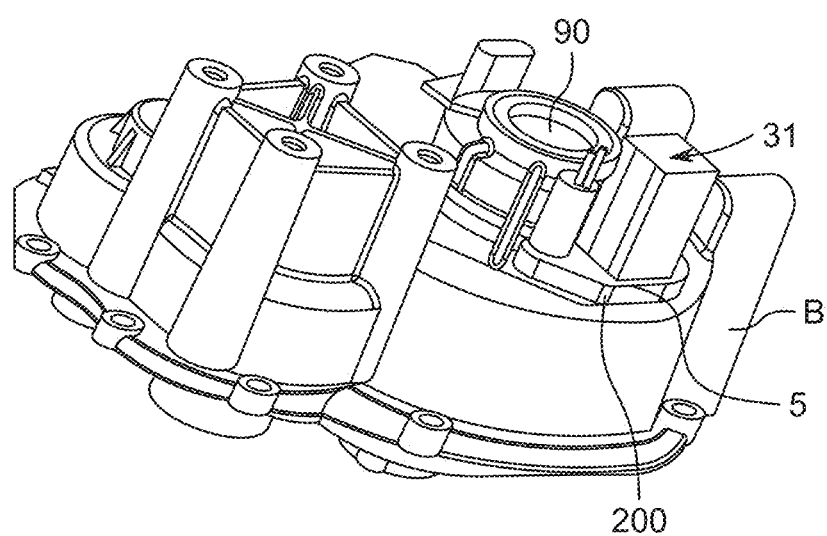
FIG. 9 is a perspective view of the sixth embodiment, depicted with the reduction gearbox casing.

It may be seen from FIG. 9 that the electromagnetic actuator 31 and the sensor 90 are mounted outside of the reduction gearbox casing B, against the wall 5 thereof. In this embodiment, the lever 42 is positioned fully in the reduction gearbox casing B. The common support 200 common to the sensor 90 and to the actuator 31 may for example be screwed or riveted to the reduction gearbox casing B.

In the embodiment depicted in FIGS. 10 and 11, the lever 42 is arranged outside of the reduction gearbox casing B.

The pressure plate 46 comprises fingers 49 extending towards the lever 42 and passing through the casing of the reduction gearbox R, the lever 42 being arranged in such a way as to press against these fingers 49 and push them in order to close the dog clutch device 21. To that end, the lever 42 comprises pushing portions which may for example extend radially outward from the annular portion of the lever 42. The ends of the fingers 49 are preferably spherical to favor articulation between the lever 42 and the fingers 49. As may be seen from FIG. 11, two fingers 49 are positioned one on each side of the axis of rotation X.

In an alternative which has not been depicted, the lever may comprise pushrods that pass through the reduction gearbox casing to apply pressure to the pressure plate which is positioned inside of the reduction gearbox casing.

In the embodiment of FIG. 11, the shaft that allows the lever 42 to pivot is on the lever 42 and the cylindrical bearing surface in which the lever pivots is formed on the reduction gearbox casing B.

According to another embodiment depicted in FIG. 12, the electromagnetic actuator 31 is positioned inside of the casing B of the reduction gearbox R. The rod 43 associated with the mobile element 33 has an end inserted in an opening in the lever 42, with clearance, so as to allow the rod 43 to pivot with respect to the lever 42. The end of the lever 43 is axially enlarged behind the opening in the lever 42 so as to allow the rod 43 to move the lever 42 when the mobile element 33 is moved. Because the electromagnetic actuator 31 and the second coupling member 22 are axially on the same side of the pivoting lever 42, the actuator thus pulls on the lever to close the dog clutch device. Collaboration between the pressure plate 46 and the lever 42 may be similar to that detailed hereinabove.

According to another embodiment depicted in FIG. 13, the axis of pivoting Y of the lever 42 may also be situated between the two force-transmission zones of the lever 42 which face, in the case of one of them, toward the mobile element 33 (or a rod 43) and, in the case of the other one, toward the second coupling member 22 (notably via a pressure plate 46).

As applicable, one of the ends of the lever may have two pressing branches, the lever 42 having a forked pressure-fork shape.

Such a disconnection device is not necessarily used in a hybrid vehicle but may also be used in an electric vehicle.

Figure 14:
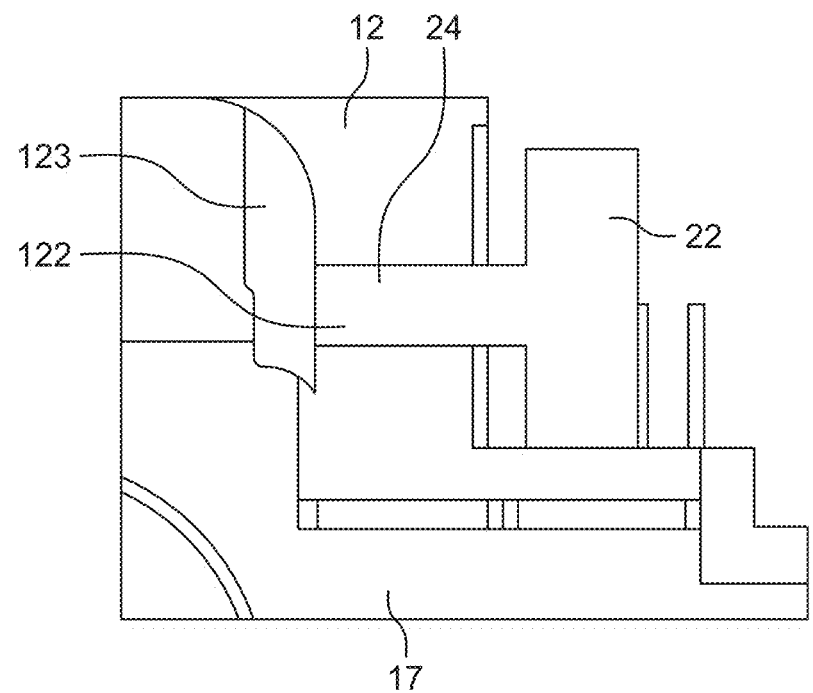
FIG. 14 is a schematic sectional view of a tenth embodiment incorporating a differential locking device.

The invention may also be applied also to a differential locking mechanism as depicted in FIG. 14. The first coupling member 23 is formed on the first output member 17 of the differential drive device 11, and the second coupling member 22 is mounted on, so as to rotate as one with, the differential casing 12. The first output member 17 is thus secured, in terms of rotation, to the differential casing when the dog clutch device is closed such that the first and second output members 17 and 18 of the differential drive device 11 rotate at the same speed.

FIG. 14 shows a second coupling member 22 in which teeth are formed on fingers 24 and the disc of the second coupling member 22 is outside of the differential casing 12. The fingers 24 and the disk of the second coupling member 22 may be assembled for example by crimping. Each tooth is formed by the end of a finger 24 and can engage with a complementing tooth 123 belonging to the first coupling member 23.

Alternatives which are not described here may be implemented without departing from the context of the invention, provided that, in accordance with the invention, they comprise at least a differential drive system according to the aspect of the invention.

The invention claimed is:

1. A differential drive system for a vehicle, comprising:
   a differential drive device comprising a differential casing housing a differential gearset, the differential gearset being able to transmit torque from the differential casing to a first output side shaft and a second output side shaft which each drive a wheel of the vehicle, the first output side shaft and the second output side shaft extending along an axis of rotation X,
   a dog clutch device comprising a first coupling member and a second coupling member, the second coupling member being able to be rotationally driven about the axis of rotation X and being able to move axially along the axis of rotation X with respect to the first coupling member so as to engage with the first coupling member or disengage therefrom, the first coupling member being formed by a toothed torque-transmission member of the differential drive device,
   an electromagnetic actuator comprising an annular electromagnet able to generate a magnetic field to move a mobile element between a first position associated with the engaged state of the dog clutch device, and a second position associated with the disengaged state of the dog clutch device,
   wherein the axis of rotation X is situated outside of the annular electromagnet of the electromagnetic actuator, and the differential drive system further comprises a force-transfer mechanism designed to transfer the forces of actuation of the mobile element of the electromagnetic actuator to the second coupling member of the dog clutch device,
   wherein the force-transfer mechanism comprises a pressure plate mounted to slide axially on the differential casing,
   wherein the differential casing forms a torque input member of the differential drive device and the differential drive device further comprises a first output member able to be coupled to the first output side shaft, and a second output member able to be coupled to the second output side shaft,
   wherein the differential drive system is provided with a disconnection mechanism configured to interrupt the transmission of torque between the differential casing and the differential gearset when the dog clutch device is open, wherein the first coupling member is radially encompassed by the differential casing, and wherein the first coupling member forms an auxiliary input member of the differential drive device, the differential gearset being configured to transmit torque between the auxiliary input member and the first and second output members of the differential drive device, the auxiliary input member being mounted with the freedom to rotate with respect to the differential casing and being secured in terms of rotation to the differential casing only when the dog clutch device is closed.

2. The differential drive system as claimed in claim 1, wherein the second coupling member is able to be rotationally driven about the axis of rotation X with the differential casing.

3. The differential drive system as claimed in claim 1, wherein the differential casing has holes distributed about the axis of rotation X, and the second coupling member has fingers passing axially through these holes so as to secure, in terms of rotation about the axis of rotation X, the second coupling member and the differential casing.

4. The differential drive system as claimed in claim 1, wherein the electromagnetic actuator is positioned in such a way that the mobile element moves parallel to the axis of rotation X; and the force-transfer mechanism is mobile, in axial translation along the axis.

5. The differential drive system as claimed in claim 1, wherein the differential drive system comprises a plurality of electromagnetic actuators, the force-transfer mechanism connecting each electromagnetic actuator to the second coupling member.

6. The differential drive system as claimed in claim 1, wherein the force-transfer mechanism comprises a pressure plate positioned outside of the differential casing.

7. The differential drive system as claimed in claim 1, wherein the force-transfer mechanism is configured to increase the force of actuation generated by the actuator by means of a lever arm.

8. The differential drive system as claimed in claim 1, wherein the actuator is a linear actuator.

9. A differential drive system for a vehicle, comprising:
a differential drive device comprising a differential casing housing a differential gearset, the differential gearset being able to transmit torque from the differential casing to a first output side shaft and a second output side shaft which each drive a wheel of the vehicle, the first output side shaft and the second output side shaft extending along an axis of rotation X, a dog clutch device comprising a first coupling member and a second coupling member, the second coupling member being able to be rotationally driven about the axis of rotation X and being able to move axially along the axis of rotation X with respect to the first coupling member so as to engage with the first coupling member or disengage therefrom, the first coupling member being formed by a toothed torque-transmission member of the differential drive device, an electromagnetic actuator comprising an annular electromagnet able to generate a magnetic field to move a mobile element between a first position associated with the engaged state of the dog clutch device, and a second position associated with the disengaged state of the dog clutch device, wherein the axis of rotation X is situated outside of the annular electromagnet of the electromagnetic actuator, and the differential drive system further comprises a force-transfer mechanism designed to transfer the forces of actuation of the mobile element of the electromagnetic actuator to the second coupling member of the dog clutch device, wherein the differential casing forms a torque input member of the differential drive device and the differential drive device further comprises a first output member able to be coupled to the first output side shaft, and a second output member able to be coupled to the second output side shaft, wherein the differential drive system is provided with a disconnection mechanism configured to interrupt the transmission of torque between the differential casing and the differential gearset when the dog clutch device is open, wherein the first coupling member is positioned inside of the differential casing, and wherein the first coupling member forms an auxiliary input member of the differential drive device, the differential gearset being configured to transmit torque between the auxiliary input member and the first and second output members of the differential drive device, the auxiliary input member being mounted with the freedom to rotate with respect to the differential casing and being secured in terms of rotation to the differential casing only when the dog clutch device is closed, wherein the force-transfer mechanism comprises a pressure plate positioned outside of the differential casing, and wherein the force-transfer mechanism comprises a pivoting lever able to push the pressure plate.

10. The differential drive system as claimed in claim 9, wherein the force-transfer mechanism comprises a first contact zone collaborating with the mobile element of the electromagnetic actuator and moving with same; and a second contact zone collaborating with the second coupling member and moving axially with same.

11. The differential drive system as claimed in claim 9, wherein the pivoting lever comprises an annular portion arranged around the axis of rotation X.

12. The differential drive system as claimed in claim 9, wherein the force-transfer mechanism comprises a first part and a second part able to rotate relative to one another about the axis of rotation X.

13. The differential drive system as claimed in claim 9, wherein the annular electromagnet is positioned around an axis, this axis being offset from the axis of rotation X and the axis of rotation X being positioned, with respect to the axis of the electromagnet, radially outside of the annular electromagnet.

14. A transmission system comprising a reduction gearbox housed in a reduction gearbox casing and a differential drive system as claimed in claim 9, the electromagnetic actuator being positioned outside of the reduction gearbox casing.

15. The differential drive system as claimed in claim 9, wherein the differential casing has holes distributed about the axis of rotation X, and the second coupling member has fingers passing axially through these holes so as to secure, in terms of rotation about the axis of rotation X, the second coupling member and the differential casing.

16. The transmission system as claimed in claim 14, wherein the differential casing is configured to be guided in the reduction gearbox casing by a rolling contact bearing.

17. The differential drive system as claimed in claim 9, wherein the actuator is a linear actuator.

\* \* \* \* \*